United States Patent
Doyle et al.

(10) Patent No.: US 6,438,550 B1
(45) Date of Patent: Aug. 20, 2002

(54) METHOD AND APPARATUS FOR CLIENT AUTHENTICATION AND APPLICATION CONFIGURATION VIA SMART CARDS

(75) Inventors: Ronald Patrick Doyle; John Raithel Hind; Julie Hayes King, all of Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/208,776

(22) Filed: Dec. 10, 1998

(51) Int. Cl.[7] .............................................. G06F 17/30
(52) U.S. Cl. ............................ 707/9; 707/1; 707/100; 707/101; 709/227; 709/229; 713/155; 713/156; 380/258; 380/281
(58) Field of Search ..................... 707/200, 9; 713/182, 713/200, 201, 202, 185; 380/30, 283, 284; 709/217, 219, 227

(56) References Cited

U.S. PATENT DOCUMENTS

| | | | | |
|---|---|---|---|---|
| 4,218,738 A | * | 8/1980 | Matyas et al. | 364/200 |
| 5,191,611 A | * | 3/1993 | Lang | 380/25 |
| 6,061,790 A | * | 5/2000 | Bodnar | 713/171 |
| 6,085,320 A | * | 7/2000 | Kaliski, Jr. | 713/168 |
| 6,105,131 A | * | 8/2000 | Carroll | 713/155 |
| 6,128,738 A | * | 10/2000 | Doyle et al. | 713/185 |

OTHER PUBLICATIONS

Applied Cryptography second edition, Schneier Bruce, ISBN 0–471–12845–7, QA76.9.A25S35, p. 566–575, 1996.*

* cited by examiner

Primary Examiner—Diane D. Mizrahi
Assistant Examiner—Jacques Veillard
(74) Attorney, Agent, or Firm—Jeanine S. Ray-Yarletts

(57) ABSTRACT

A data processing system for accessing a host computer. A smart card is detected at the data processing system, which in turn queries the smart card for an indication of a location of user information. A secure channel is established with the location of user information. User information is retrieved associated with the smart card from the location. A connection is established to the host computer with the user information. Key to this invention is the ability to use this infrastructure for authentication when a smart card cannot be used at the data processing system.

36 Claims, 9 Drawing Sheets

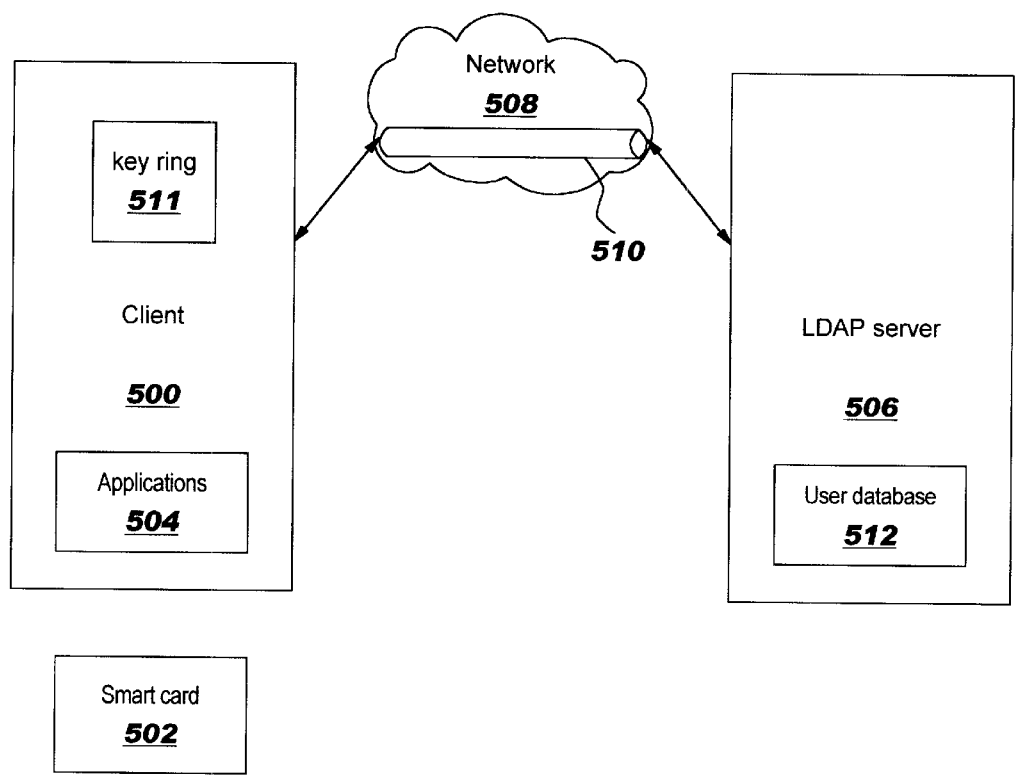

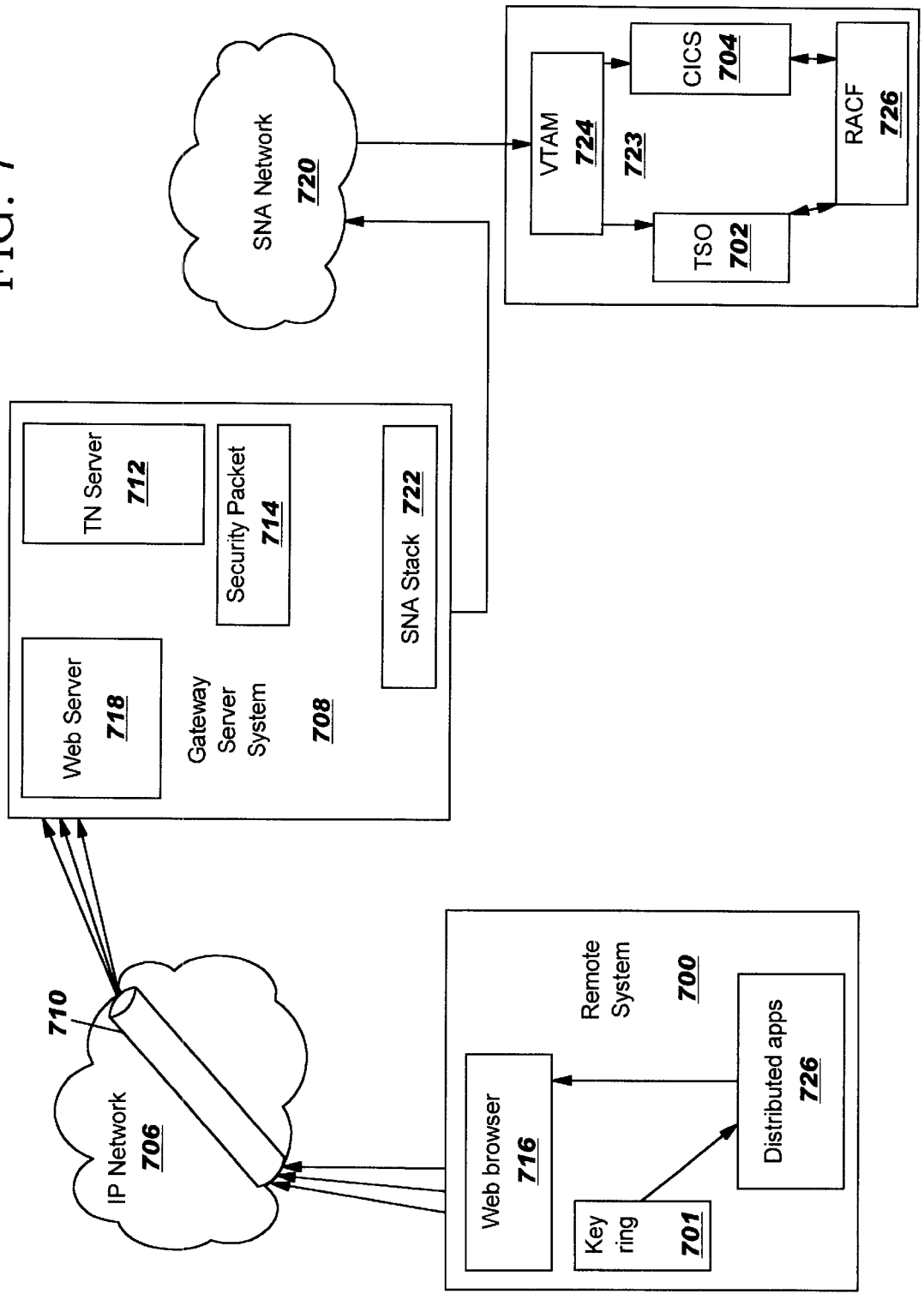

METHOD AND APPARATUS FOR CLIENT AUTHENTICATION AND APPLICATION CONFIGURATION VIA SMART CARDS

BACKGROUND OF THE INVENTION

1. Technical Field

The present invention relates generally to an improved distributed data processing system and in particular to a method and apparatus for client authentication and/or application configuration. Still more particularly, the present invention provides a method and apparatus for client authentication and/or application configuration using smart cards.

2. Description of Related Art

Security is a significant issue in the computing industry. Most computer systems employ user identification and a password for verification of a user prior to allowing the user to access data within a computer while maintaining a secure environment for computing. With client authentication, the issue is validating that a particular client is who the client says that it is. Once a client is authenticated, then the identity also may be used to access various resources, such as applications or databases. Beyond access control, personalized configuration or personal defaults for a user is another issue of interest. Personalized configuration or personal defaults involves being able to tailor computer system behavior based on client identity.

Up to now, schemes involving using a smart card for identity assumed that all access to a system would be made using the smart card and did not address the equally important issue of personalized configuration. One problem is that a given system user may be mobile and that the user may find, on occasion, a need to use a different computer system other than the normally assigned computer system.

Whilst smart card technology has evolved rapidly, significant limitations still exist as to the storage available on such a card. A smart card is typically a credit card sized device containing an embedded processor that stores information. Smart cards are typically used in computer security for authentication of users to various computer systems. The industry preferred technology for secure access today is based on public key algorithms using standard based certificates and encodings. Because of this, in conjunction with the need to represent roles and allow distributed rather than centralized administration of certificates, the size of an end user's Public Key Infrastructure (PKI) key-ring often will exceed the storage capacity of even the largest smart card.

Historically, before PKI exploitation, a typical user may have several identifiers and passwords for which the user is responsible. For example, a user might have one user identification and password to gain access to the user's workstation, another user identification and password to gain access to a terminal emulator, another user identification and password to gain access to electronic mail, and yet additional different identifications and passwords used to access different applications. In many instances, these passwords are set to expire after certain dates to improve security, which means that each of the passwords will have rules for creating the password (such as five alpha numeric characters with the second character being numeric) and set expiration dates (such as 30 days, 45 days, or 60 days). The configuration of computer networking becomes unmanageable quickly because it is extremely difficult to keep all passwords and user identifications synchronized. As a result, many users resort to writing their user identifications and passwords on a piece of paper, somewhat eliminating the security benefit intended by the passwords. Even personal users of a computer network may be faced with an excess of user identification and password requirements, such as a user identification and password for their Internet provider, one for electronic mail, another for various bulletin boards which a user may subscribe to.

A need has arisen for single sign-on products. These products are becoming available on the market place today. Many of these products keep a list of all the identifications and maps the user from one "single" sign-on to the appropriate user identification/password pair for their destination. As a result, the user identification/password changes in the data stream transparently to the user. This approach, however, requires significant administrative effort to prime the database with the correct user/password pairs and require synchronization of password databases as passwords change or expire.

Therefore, it would be advantageous to have an improved method and apparatus for allowing client authentication to various servers and to allow access to configuration information for various software applications at whatever client computer a user may access.

SUMMARY OF THE INVENTION

The system and associated method provides for a method in a data processing system for accessing a target computer. A smart card is detected at the data processing system, which in turn queries the smart card for an indication of a location of user information. This target computer may be, for example, a host computer or another server in an Internet Protocol network. A secure channel is established with the location of user information. User information is retrieved associated with the smart card from the location. A connection is established to the target computer with the user information. Key to this invention is the ability to use this infrastructure for authentication when a smart card can not be used at the data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an illustration of a process used to retrieve a user's key-ring in accordance with a preferred embodiment of the present invention;

FIG. 6 is an example of a user's entry in the directory in accordance with a preferred embodiment of the present invention;

FIG. 7 is a diagram of a process for accessing a host in accordance with a preferred embodiment of the present invention;

DETAILED DESCRIPTION OF THE PREFERRED EMBODIMENT

Figure 1:
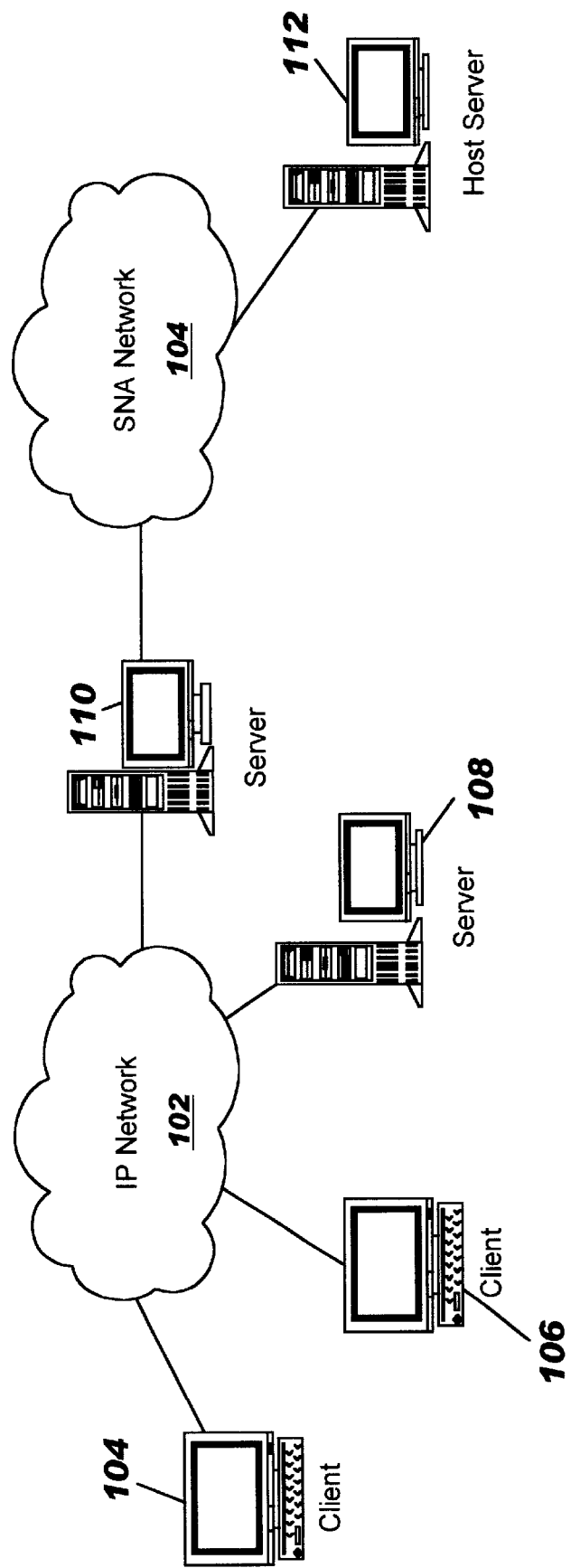
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains an Internet Protocol (IP) network 102 and a systems network architecture (SNA) network 104, which is the medium used to provide communications between various devices and computers connected together within distributed data processing system 100. IP network 102 and SNA network 104 may include permanent connections, such as wire or fiber optic cables, or temperate connections made through telephone connections.

In the depicted example, clients 104 and 106 are connected to IP network 102. In addition, server 108 and server 110 are connected to IP network 102. Server 110 provides a connection between IP network 102 and SNA network 104. A host server 112 is connected to SNA network 104. Client 104 and client 106 may be clients of various servers, such as server 108, server 110, or host server 112. Clients 104 and 106 may be, for example, personal computers, workstations, or network computers. For the purposes of this application, a network computer is any computer, coupled to a network, which receives a program or other application from another computer coupled to the network. In the depicted example, host server 112 may provide data, such as boot files, operating system images, and applications to clients 104 and 106. This information also may be provided through server 108 or server 110 depending on the configuration of distributed data processing system 100. Distributed data processing system 100 may include additional servers, clients, networks, and other devices not shown.

In the depicted example, IP network 102 is the Internet, representing a worldwide collection of networks and gateways that use the TCP/IP suite of protocols to communicate with one another. At the heart of the Internet in this example is a backbone of high-speed data communication lines between major nodes or host computers, consisting of thousands of commercial, government, educational, and other computer systems, that route data and messages. In this example, SNA network 104 contains a logical structure, formats, protocols, and operational sequences for transmitting information units through, and controlling the configuration and operation of, networks. The layered structure of SNA network 104 allows the ultimate origins and destinations of information, that is, the end users to be independent and unaffected by the specific SNA network services and facilities used for information exchange. A number of layers are provided for the end user, which include a transaction services layer, a presentation services layer, a data flow control layer, a transmission control layer, a path control layer, a data link control layer, and a physical control layer.

FIG. 1 is intended as an example, and not as an architectural limitation for the processes and apparatus of the present invention.

Figure 2:
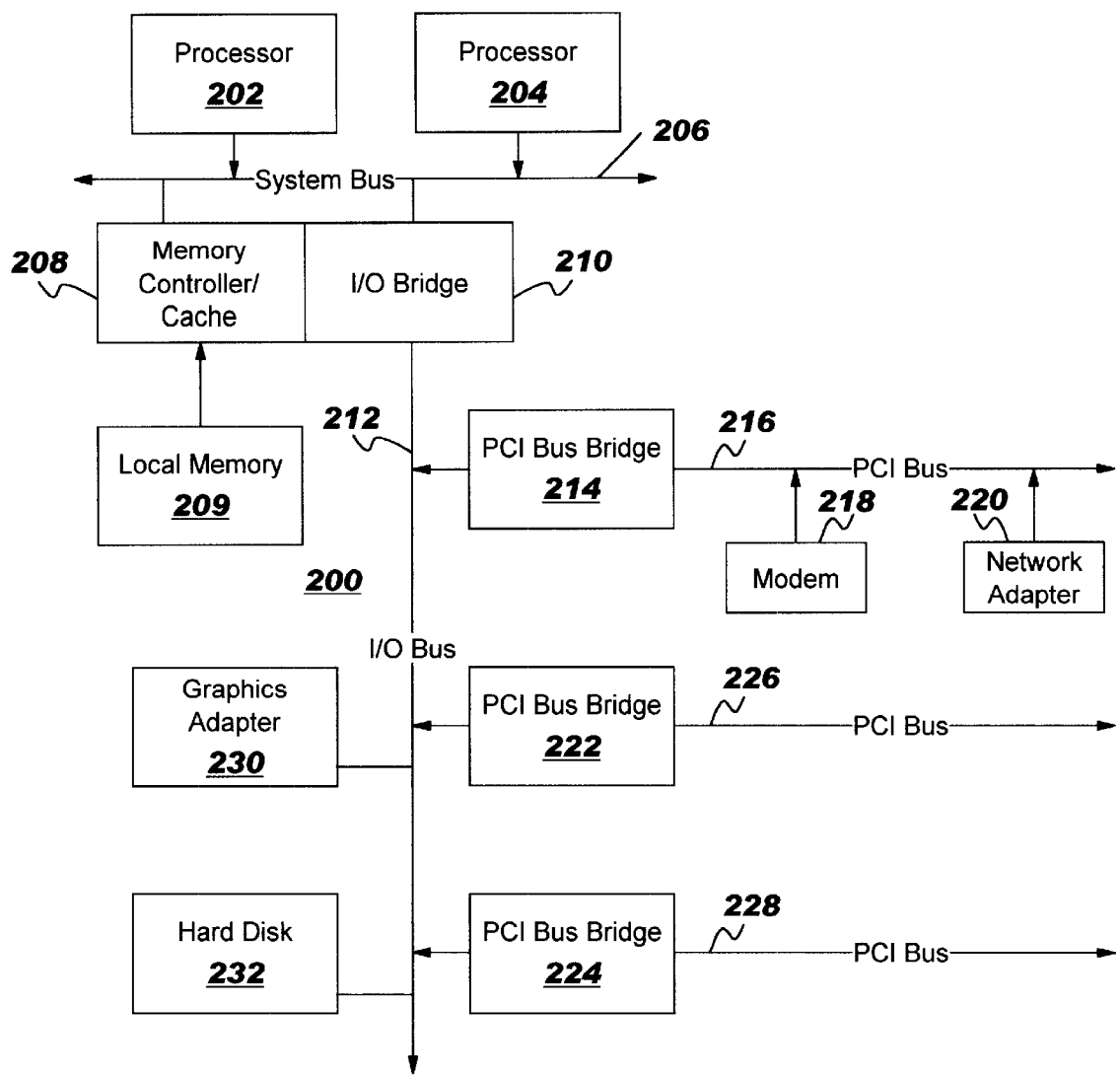
FIG. 2 is a block diagram of a data processing system, which may be implemented as a server.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
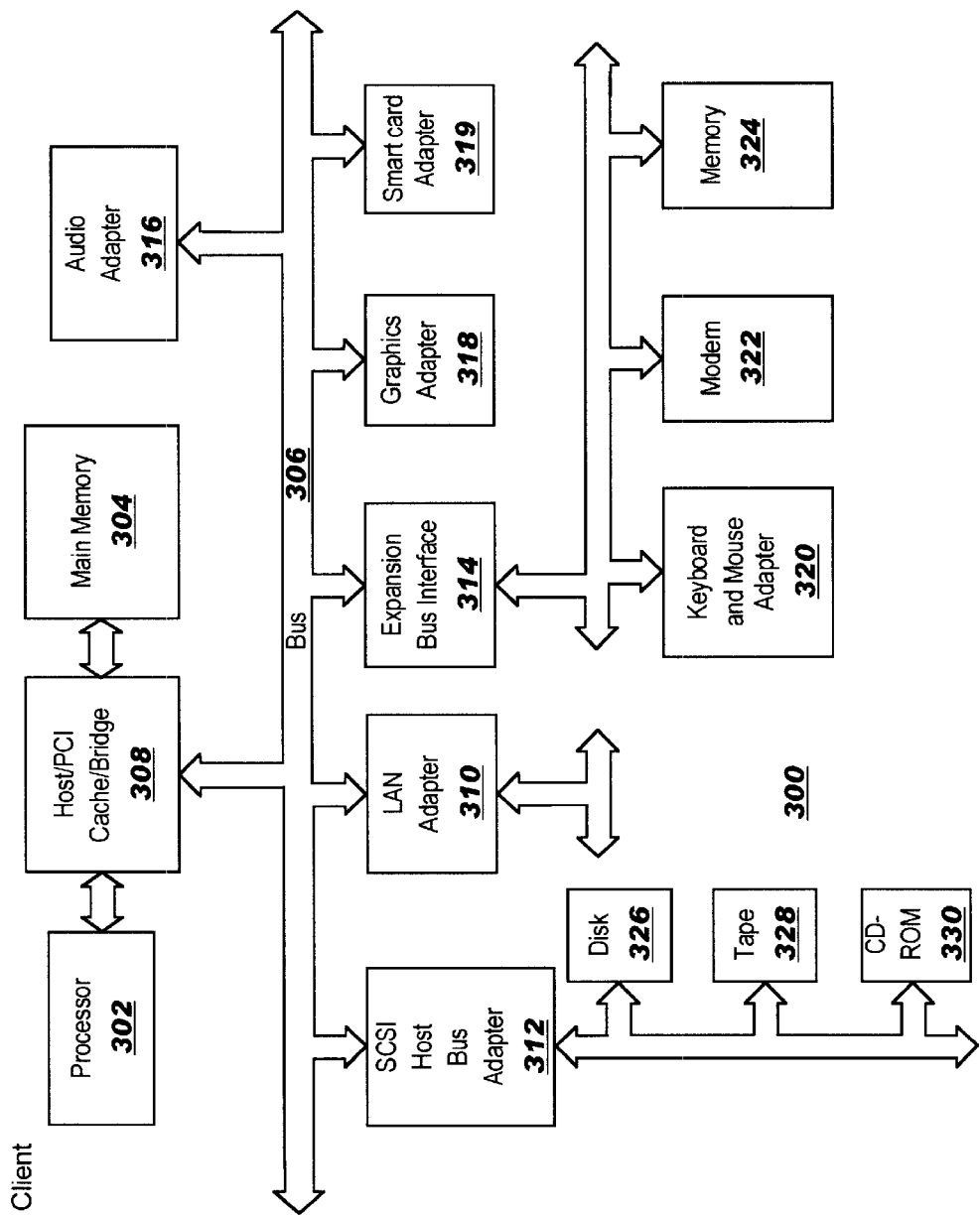
FIG. 3 is a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small Computer System Interface (SCSI) host bus adapter 312, and expansion bus interface 314 are connected to PCI local bus 306 by direct component connection. In contrast, audio adapter 316, graphics adapter 318, and smart card adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, CD-ROM drive 330, and digital video disc read only memory drive (DVD-ROM) 332 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing systems.

The present invention provides a method, apparatus, and instructions for allowing a single set of information to be stored on a smart card to enable access to a directory entry on a computer. In the depicted example, the directory entry is contained in an industry standard directory server, which is based on Lightweight Directory Access Protocol (LDAP) or X.500. The eNetwork Directory Server from International Business Machines Corporation, NDS from Novell, and Active Directory from Microsoft are examples of directory servers. This directory entry allows client authentication to a number of servers and access to configuration information for any of a number of software applications. According to the present invention, the information stored on a smart card may be stored on other storage devices, such as, for example, a floppy disk, a hard disk, or a CD-ROM, or be remembered and typed by the user at a prompt. These other storage devices may be used in accessing a server. In this manner, client authentication to servers and access to configuration information may be provided to users who may use different computer systems in which some of these computer systems may not have a smart card reader.

Figure 4:
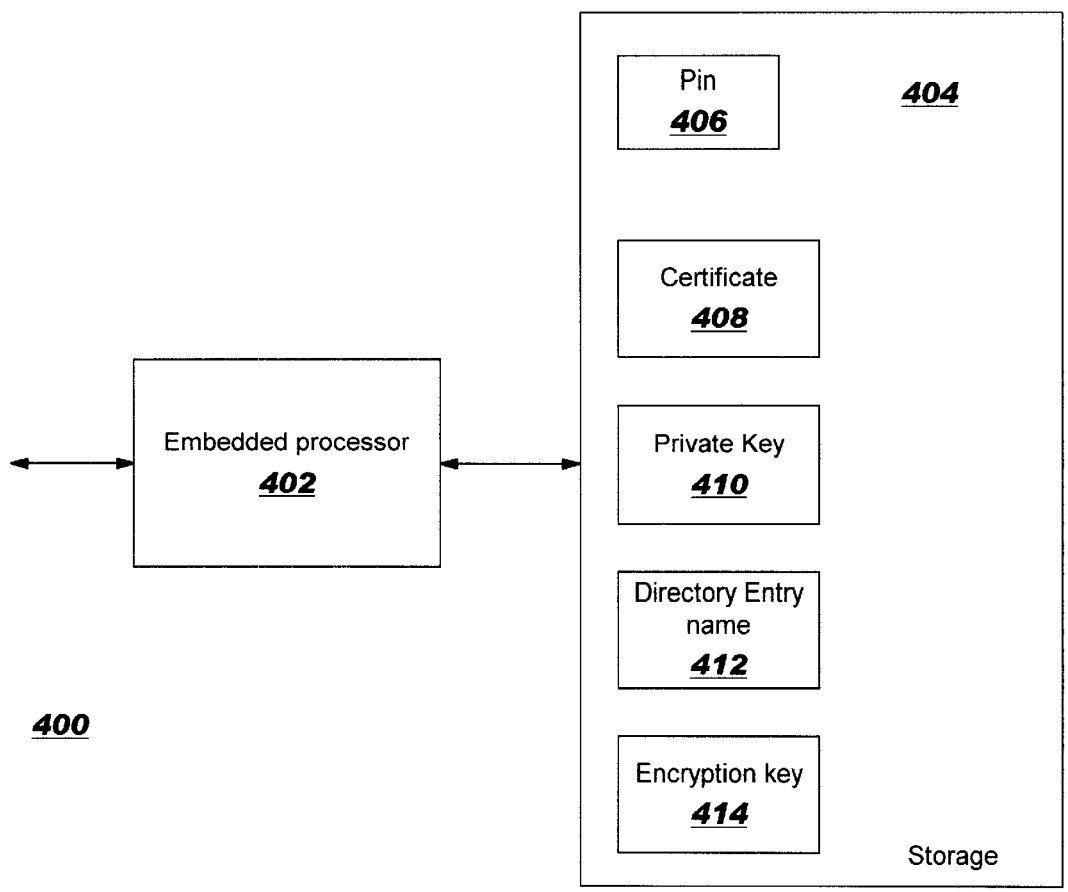
FIG. 4 is a diagram of a smart card in accordance with a preferred embodiment of the present invention.

With reference now to FIG. 4, a diagram of a smart card is depicted in accordance with a preferred embodiment of the present invention. Smart card 400 in the depicted example is a credit card sized device in which embedded microprocessor 402 is connected to storage 404, which contains a Personal Identification Number (PIN) 406, a certificate 408, and a private key 410. Embedded processor 402 provides access to certificate 408 and private key 410 only when a correct PIN, matching PIN 406, is entered. In other embodiments, PIN 406 may not be stored on the card, but is the encryption key to scramble certificate 406 and private key 410. Alternatively, certificate 408 and private key 410 may be stored on some other type of storage device, such as, for example, a floppy disk, a hard drive, or a CD-ROM encrypted by a PIN. Smart card 400 is used in connection with smart card adapter 319 in FIG. 3 to retrieve certificate 408, private key 410, and directory entry name 412. Certificate 408 and private key 410 are used to create a secure and cryptic communications link to a server to obtain an encrypted key ring from a directory entry, which is identified by directory entry name 412 and is encrypted by key 414. Of course, other mechanisms may be used to identify the appropriate key ring other than directory entry name 412. For example, a user name or identification may be employed to obtain access to the key ring for the user. Alternatively, a bind password may be used in place of certificate 408 and private key 410 in creating a secure and cryptic channel to a server for accessing a key ring. In the depicted example, the key ring contains a list of certificates, private keys, and certificate authorities. A certificate is a file that identifies a person or organization and a public key. A bind password is an alternate security control used to provide access to a directory entry. A bind password is analogous to a user's password. Directory entry name 412 is a directory entry name associated with the user, providing a hint to allow an access device to find the server on which the entry exists. The credentials allowing actual access to the directory entry is ideally a certificate/private key pair, such as certificate 408 and private key 410. Alternatively, a password may be used. In addition, the key ring normally would be encrypted for protection, which would require the use of an encryption key 414 that would require entry of PIN 406 or another PIN to be entered for actual access to the key ring. In the depicted example, both the credentials and the encryption key are marked in the smart card memory as protected, which requires entering a PIN by the user for access.

With reference now to FIG. 5, an illustration of a process used to retrieve a user's key ring is depicted in accordance with a preferred embodiment of the present invention. The user's key ring also may contain a list of the user's private keys in addition to associated certificate and certificate chains. In addition, the user's key ring also contains a list of certificates of trusted certificate authorities and/or certificate roots. Furthermore, configuration information may be retrieved for the user. A user may decide to gain access to client 500 using smart card 502. By using smart card 502, client 500 may initiate an application within applications 504 to prompt the user for a personal identification number to be returned to the smart card in order to gain access to Lightweight Directory Access Protocol (LDAP) server 506 via network 508. After entry of the personal identification number, smart card information concerning the directory entry name is read from smart card 502 and a connection to LDAP server 506 is created via a secure encrypted channel 510. This secure encrypted channel is established using the credentials on the smart card, which in the depicted example is a certificate/private key pair. Alternatively, a password may be used to establish the secure encrypted channel. Encrypted key ring 511 for the user is retrieved from user database 512. In addition, client configuration information for the user may be read from user database 512. The key ring is decrypted using an encryption key located within smart card 502. Then, a proper certificate/private key pair for a server, such as a Telnet server, is selected from the key ring.

Turning next to FIG. 6, an example of an entry in user database 512 from FIG. 5 is depicted in accordance with a preferred embodiment of the present invention. Entry 600 is a user entry containing typical information for a user, such as telephone numbers, addresses in 602. In addition, section 604 contains an encrypted copy of the user's key ring. A list of certificates is found in section 606 of entry 600. Section 606 also may contain in addition to or in place of a list of certificates, certificate routes. Personalized configuration information is stored in section 608, which may identify various applications and settings for those applications with which a user interacts. Each of these sections may contain the necessary information or pointers to the necessary information for a particular user. Entry 600 is indexed through directory entry name in section 610. This directory entry name is the same directory entry name located on a smart card in the depicted example.

With reference now to FIG. 7, a diagram of a process for accessing a host is depicted in accordance with a preferred embodiment of the present invention. This example illustrates a user accessing a host after obtaining a key ring from a server. In the depicted example, a three-tier example is shown in which a user accesses the SNA network through an IP/SNA gateway. A user at remote system 700, using key ring 701, accesses a secure host application, such as, for example, Time Sharing Option (TSO) 702 or Custom Information Control System (CICS) 704 by a request from remote system 700, through an IP network 706 to a gateway server system 708. Path 710 through IP network 706 is a path that information takes in traveling from the user at remote system 700 to gateway server system 708. Path 710, in the depicted example, uses a secure socket layer (SSL), which provides encryption and public key authentication. This mechanism allows information sent across channel 710 to be secured from tampering or tracing by unauthorized users.

At gateway server system 708, the application managing communication in the depicted example is a Telnet (TN) server application 712. This application creates a security packet 714, which in the depicted example is an encrypted security packet containing a certificate, a token, a token signature, and the certificate chain of the signer. More information on encrypted security may be found in Certificate Based Security in SNA Data Flows, Ser. No. 09/064,632, filed Apr. 22, 1998, attorney docket CR9-98-033. In this example, the signature may be created using the end user's private key. The token within the packet includes one of the end user's X.509 personal certificate from certificates 606 in FIG. 6, a time/date stamp, plus the SNA session identification on which the packet will be transmitted.

Incorporating the SNA session identification into the packet ensures that the person monitoring or tracing the communication could not reuse the packet to gain access to the information. If an intruder attempted to reuse the security packet, the session identification would not be correct and the access attempt would fail. The time/date stamp further limits the use of the packet and provides additional audit information should the administrator choose to log connection events. Token signature in the depicted example is an X.509 signature algorithm type code, which may be for example, RSA+MD5, RSA+SHA, or TSS, known in the art.

The information may be sent through web browser 716 to web server 718. In turn, web server 718 provides the request to TN server 712, which creates security packet 714. Security packet 714 is sent through SNA network 720 through SNA stack 722. SNA stack 722 contains the various layers needed to transfer information to SNA network 720. From SNA network 720, host computer 723 receives the information at virtual telecommunications access method (VTAM) 724. VTAM 724 contains a set of programs that maintain control of the communication between terminals and the application programs running under different host operating systems. VTAM 724 verifies the signature and verifies that the session identification encrypted with the token is the same session identification from which the token came.

Upon a successful verification, VTAM 724 passes information, such as certificate to resource access control facility (RACF) 726 for verification. If RACF 726 determines that the packet signer was a trusted delegate, then RACF 726 knows that the user certificate was validated at the mid tier (SSL in this example) and then the user is allowed to access secure applications, such as TSO 702 or CICS 704. If RACF 726 determines that the certificate is not from a trusted party, then the session is rejected.

In addition, after determining that the certificate is from a trusted party, personalized or configuration defaults for these various applications may be applied for the particular user at client 700. Various applications may be downloaded to client 700, such as, for example, distributed applications 728. The types of applications that may be downloaded can be configured based on user configuration information sent up to host computer 722. Although the depicted example involves a three tier access to the host computer, this portion of the invention could also be applied to a two tier access in which the client is directly connected to a SNA network, rather than using a gateway to the SNA network.

Figure 8:
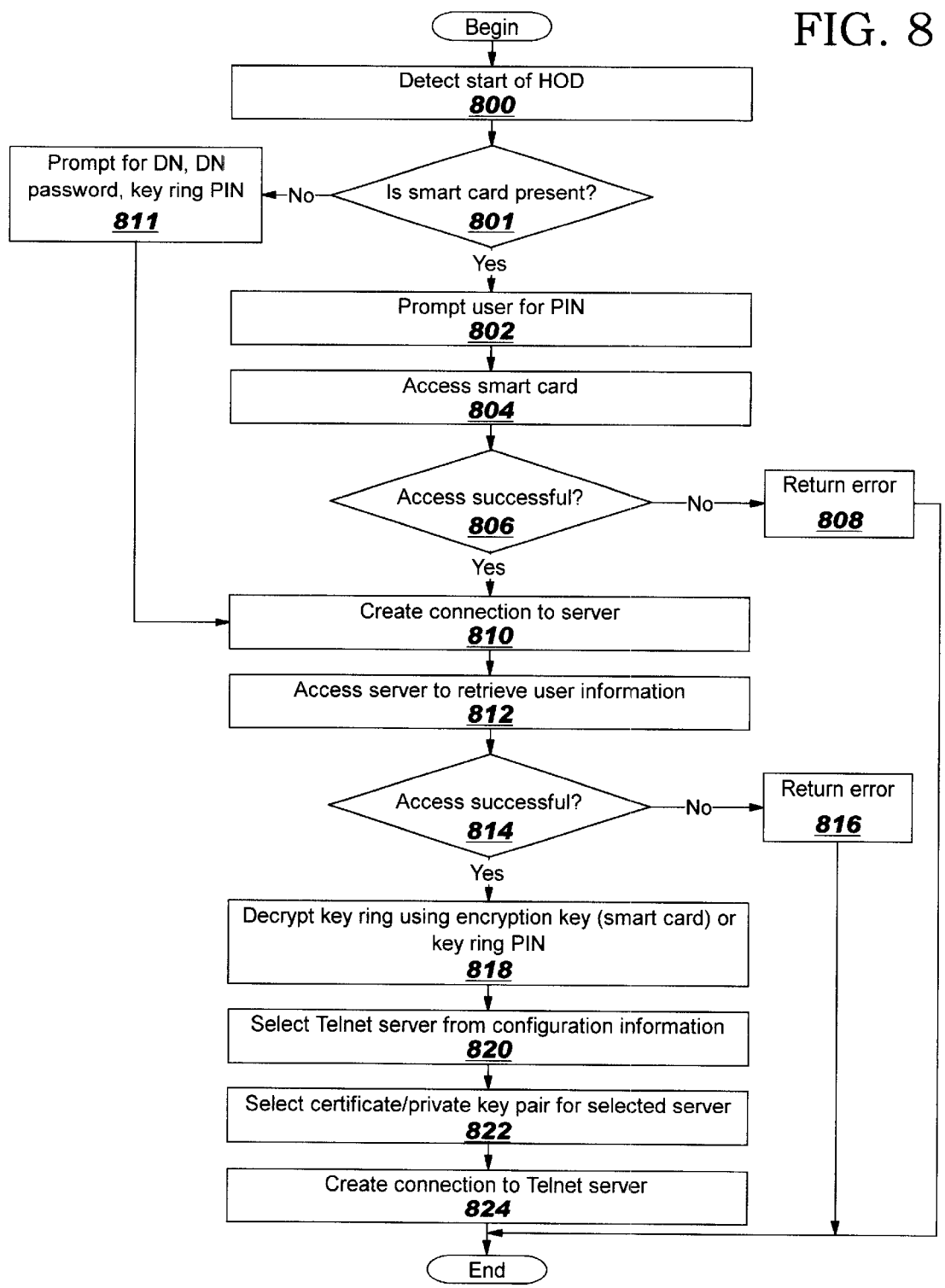
FIG. 8 is a flowchart of a process for retrieving a key ring and user configuration information in accordance with a preferred embodiment of the present invention.

Turning now to FIG. 8, a flowchart of a process for retrieving a key ring and user configuration information is depicted in accordance with a preferred embodiment of the present invention. This process is implemented in a client computer for accessing key ring and configuration information for a user in response to the user accessing the client with a smart card. The process begins by detecting the start of an access window, such as a host on demand (HOD) window (step 800). Next, a determination is made as to whether a smart card or other access device containing the appropriate data structures is present (step 801). If a smart card or other access device containing the appropriate data structures is present, the user is prompted to enter a PIN that will be used to access data within the smart card (step 802). The smart card is then accessed (step 804). In accessing a smart card, data such as the necessary information to access the appropriate server for the user key ring and configuration information is retrieved from the smart card.

A determination is then made as to whether the access to a smart card was successful (step 806). This step determines whether the personal identification number was correctly entered or whether an error or defect is present on the smart card. If the access was not successful, an error is returned (step 808) with the process terminating thereafter. Otherwise, a connection is created to the server containing the user's key ring and the configuration information (step 810).

With reference again to step 801, if a smart card is not present, the user is prompted for a distinguished name (DN), a DN password, and a key ring PIN (step 811) with the process proceeding to step 810 as described above. In step 810, the server is selected based on the information in the smart card. After the connection has been created, the server is accessed to retrieve the user information (step 812). This user information in the depicted example includes the key ring and personal configuration information for the user. A determination is made as to whether the access to the server was successful (step 814). If the access was not successful, an error is returned (step 816) with the process terminating thereafter. On the other hand, if the access to the server was successful, the key ring is decrypted using an encryption key located on the smart card or a key ring PIN (step 818). Then, a server, such as a Telnet server, is selected from the configuration information. The Telnet server may be selected by user input or by configuration information read from the server containing the user's key ring and personal configuration information (step 820). The appropriate certificate/private key pair is selected for the selected Telnet server (step 822). Next, a connection is created to the Telnet server (step 824) with the process terminating thereafter. The actual connection to the Telnet server and access to the host on the SNA network will be described in more detail below.

Figure 9:
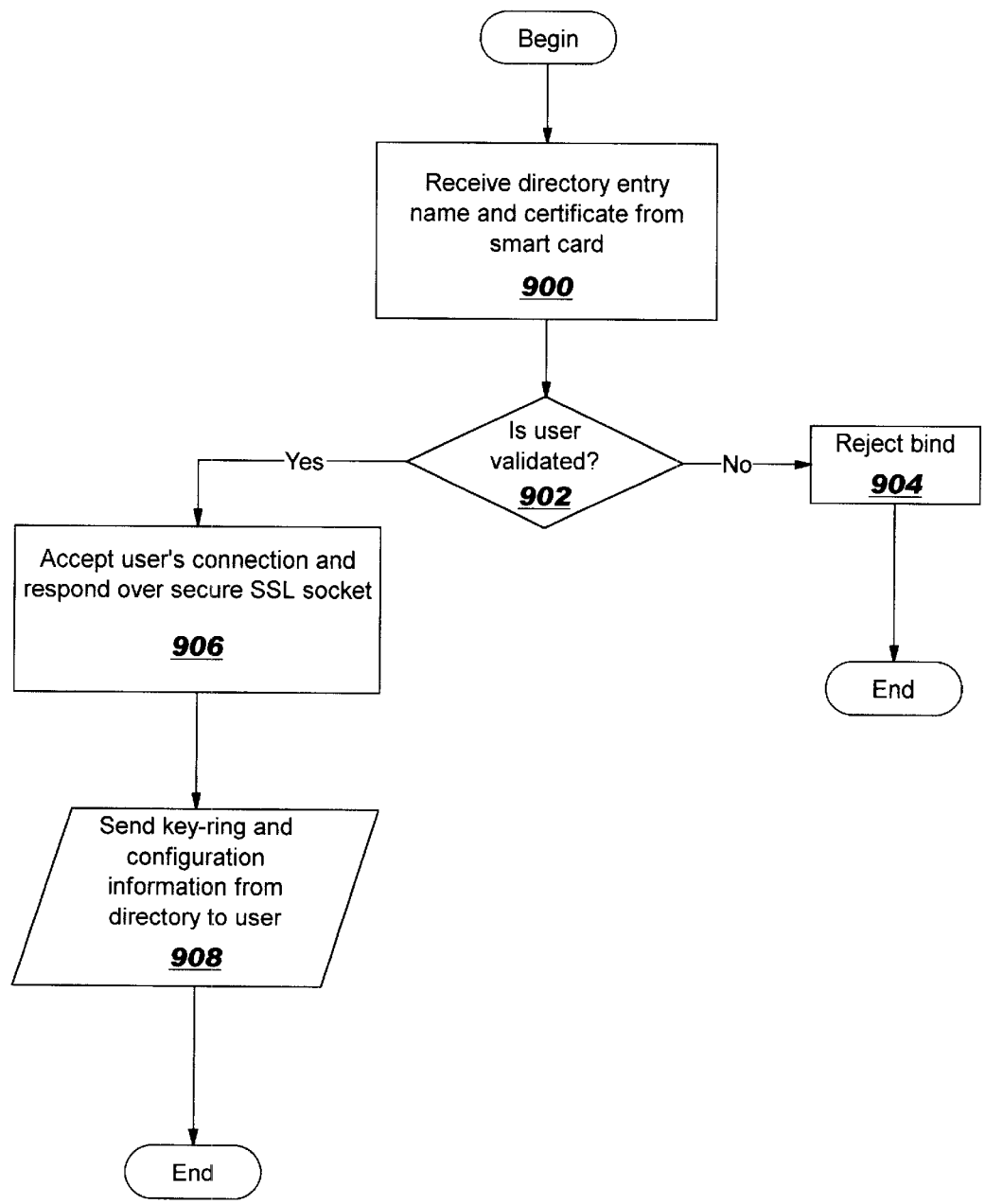
FIG. 9 is a flowchart of a process used by a server to provide access to a key-ring and user configuration information in accordance with a preferred embodiment of the present invention.

Turning now to FIG. 9, a flowchart of a process used by a server to provide access to a key ring and user configuration information is depicted in accordance with a preferred embodiment of the present invention. The process begins by receiving the directory entry name and certificate located on the smart card used by the user at the client computer (step 900). A determination is made as to whether the user is validated (step 902). This validation is made using known processes utilizing the certificate. In addition, part of the validation also is made by determining whether the directory entry name is present on the server. If the user is not validated, the bind is rejected (step 904) with the process terminating thereafter. Otherwise, the user's connection is accepted and a response is made through the communications channel, which in the depicted example is a secure SSL socket (step 906). Thereafter, the key ring and configuration information is sent to the user (step 908). This information is retrieved from the directory entry associated with the user, which was sent to the server from the smart card.

Figure 10:
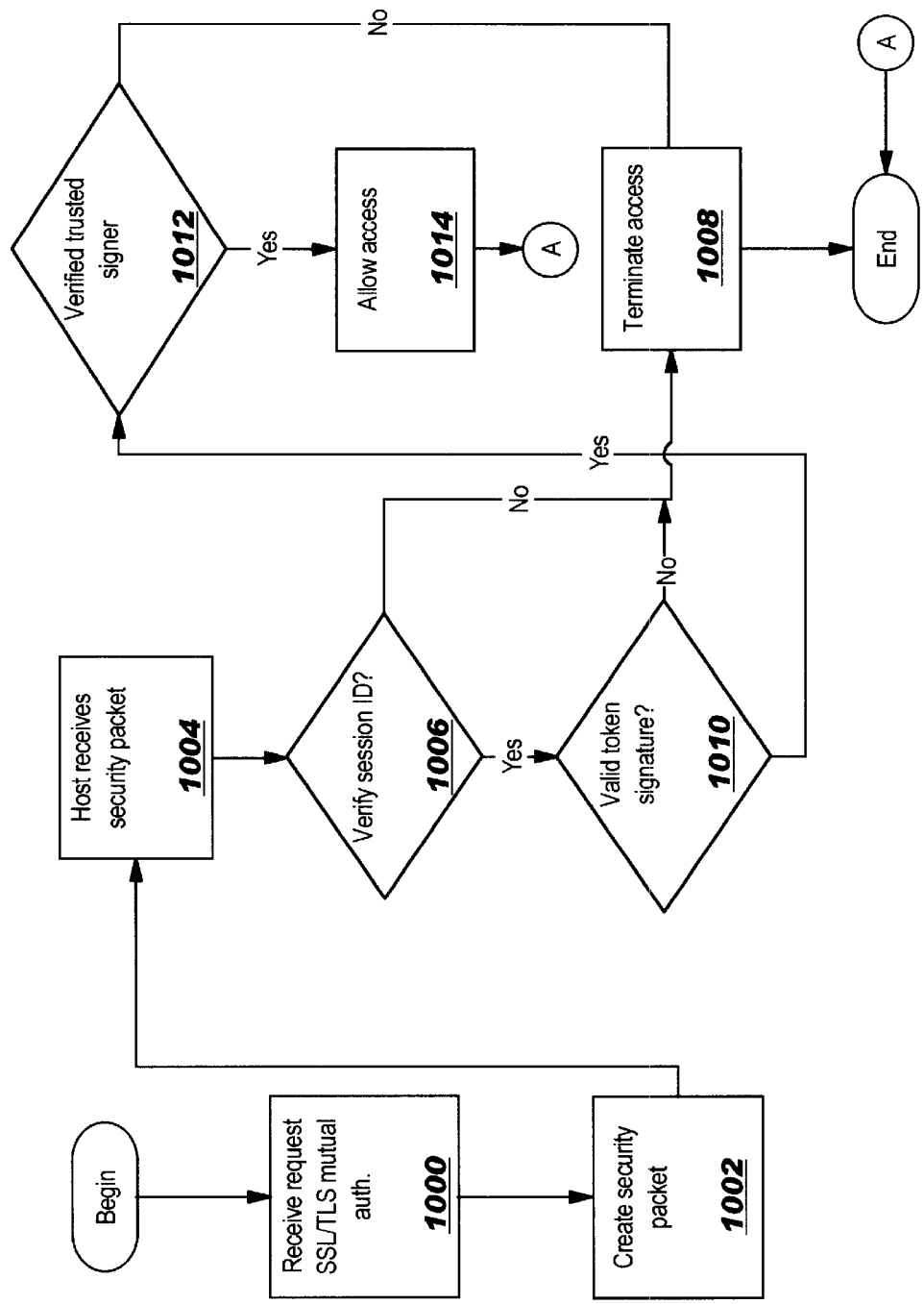
FIG. 10 is a flowchart of authentication of a user at a host on a SNA network in accordance with a preferred embodiment of the present invention.

With reference now to FIG. 10, a flowchart of authentication of a user at a host on a SNA network is depicted in accordance with a preferred embodiment of the present invention. This process is employed after the certificate and private key has been retrieved from the key ring on the LDAP server. The process begins by receiving a request for a Secure Socket Layer/Transport Layer Security (SSL/TLS) mutual authentication to be used in building a TN session with the communication server (step 1000). Once the SSL/TLS process succeeds in establishing a channel to the communications server, the user's certificate is available to the intermediate server and the server can trust the value located within the certificate. The server then uses the user's certificate and creates a security packet for the SNA session between itself and the host on the SNA network (step 1002). In doing so, the intermediate server is assuring the host that the user certificate was derived from an SSL/TLS channel whose server side library used a signer's key ring. In addition, this is assuring the host that the signer's key ring contains only certificate authorities, which the host trusts. This means that the delegation of authentication responsibility to the communications server is represented by the configured content of the signer's key-ring and the assurance that the server software will use information via SSL/TLS to validate the user's certificate submission. The host receives the security packet (step 1004). A verification is performed by checking the session ID to ensure that the session ID included in the token matches the session on which the packet arrived (step 1006). If the verification fails, access is terminated (step 1008). If the session IDs match, then a determination is made as to whether the token signature is valid (step 1010). This check is made using an algorithm indicated to verify that the token has not been tampered with. Methods for determining tampering are known in the art and not unique or pertinent to the present invention and will not be discussed further at this point. If the token shows evidence of tampering, the session is terminated (step 1008). If the session has not been tampered with, the host verifies via the certificate chain whether it trusts the signer (step 1012). If the signer's certificate is not the certificate in the token, the host verifies that the signer is in the delegation list of those trusted to enforce authentication rules. If the signer is not trusted, then the session is terminated (step 1008). Otherwise, access to the host is allowed (step 1014).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method in a computer system for accessing a host computer comprising the computer system implemented steps of:

receiving a data structure at the computer system, for use in accessing a host computer;

identifying a location of a computer containing a key ring for a user using the data structure, wherein the data structure contains an identification of the location of the computer;

retrieving the key ring for the user from the computer in communication with the computer system; and accessing the host computer using the key ring.

2. The method of claim 1, wherein the step of identifying a location of the computer includes:

obtaining the location of the computer from a smart card.

3. The method of claim 1, wherein the step of retrieving the key ring includes:

establishing a communications link to the computer;

requesting the key ring using information from the data structure; and receiving the key ring from the computer.

4. The method of claim 1, wherein the location of the computer is identified by a directory entry name for the user located in the data structure.

5. The method of claim 1, wherein the host computer is located on a Systems Network Architecture network.

6. The method of claim 1, wherein the computer system is located on a Internet Protocol network and the host computer is located on a Systems Network Architecture network and wherein the step of accessing the host computer comprises accessing the host computer through a server acting as a gateway between the internet protocol network and the systems network architecture network.

7. A method in a data processing system for accessing a host computer comprising:

detecting a smart card at the data processing system;

querying the smart card for an indication of a location of user information;

establishing a secure channel with the location of user information;

retrieving user information associated with the smart card from the location; and establishing a connection to the host computer with the user information.

8. The method of claim 7, wherein the user information includes a certificate used to access the host computer and user configuration information.

9. The method of claim 8, wherein the user configuration information includes an identification of the host computer.

10. The method of claim 7, wherein the smart card includes an indication of the location of the user information.

11. A method in a client computer for accessing a host computer from a client computer, the method comprising the computer implemented steps of:

detecting, at the client computer, a storage device used to access the host computer;

accessing the storage device to obtain information from the storage device;

establishing a connection to another computer based on the information obtained from the storage device;

retrieving a key ring from another computer using the information obtained from the storage device; and accessing the host computer using the key ring.

12. The method of claim 11, wherein the step of accessing the storage device includes:

prompting for a personal identification number;

receiving the personal identification number; and using the personal identification number to access the data structure in the storage device.

13. The method of claim 11, wherein the information obtained from the storage device includes a certificate and private key used and wherein the step of establishing a connection comprises establishing a secure connection using the certificate and private key.

14. The method of claim 11, wherein the step of accessing the host using the key ring comprises accessing the host using a certificate from the key ring.

15. The method of claim 11, wherein the key ring includes a list of certificates and private keys.

16. The method of claim 15, wherein the key ring further includes a list of signing authorities.

17. The method of claim 11, wherein the another computer is a Lightweight Directory Access Protocol server.

18. A method in a client computer for accessing a host computer from a client computer, the method comprising the computer implemented steps of:

detecting, at the client computer, a storage device used to access the host computer;

accessing the storage device to obtain information from the storage device, wherein the information obtained from the storage device includes a directory entry;

establishing a connection to another computer based on the information obtained from the storage device;

retrieving a key ring from another computer using the information obtained from the storage device by accessing the directory using the directory entry name to access a data structure in another computer to obtain the key ring; and accessing the host computer using the key ring.

19. A method in a client computer for accessing a host computer from a client computer, the method comprising the computer implemented steps of:

detecting, at the client computer, a storage device used to access the host computer;

accessing the storage device to obtain information from the storage device, wherein the information obtained from the storage device includes a directory entry name;

establishing a connection to another computer based on the information obtained from the storage device;

retrieving a key ring from another computer using the information obtained from the storage device by accessing the directory using the directory entry name to access a data structure in another computer to obtain the key ring;

retrieving configuration information associated with the directory entry name; and accessing the host computer using the key ring.

20. The method of claim 19, wherein the configuration information includes an identification of the host computer.

21. A computer system for accessing a host computer comprising:

receiving means for receiving a data structure at a client computer, for use in accessing a host computer;

identifying means for identifying a location of a computer containing a key for a user using the data structure, wherein the data structure contains an identification of the location of the computer, retrieving means for retrieving the key ring for the user from the computer in communication with the computer system; and accessing means for accessing the host computer using the key ring.

22. The computer system of claim 21, wherein the identifying means includes:

obtaining means for obtaining the location of the computer from a smart card.

23. The computer system of claim 21, wherein the retrieving means includes:

establishing means for establishing a communications link to the computer;

requesting means for requesting the key ring using information from the data structure; and receiving means for receiving the key ring from the computer.

24. A computer system for accessing a host computer comprising:

detecting means for detecting a smart card at the a data processing system;

querying means for querying the smart card for an indication of a location of user information;

establishing means for establishing a secure channel with the location of user information;

retrieving means for retrieving user information associated with the smart card from the location; and establishing means for establishing a connection to the host computer with the user information.

25. A client computer comprising:

detecting means for detecting, at the client computer, a storage device used to access a host computer;

first accessing means for accessing the storage device to obtain information from the storage device;

establishing means for establishing a connection to another computer based on the information obtained from the storage device;

retrieving means for retrieving a key ring from the another computer using the information obtained from the storage device; and second accessing means for accessing the host computer using the key ring.

26. The client computer of claim 25, wherein the first accessing means:

prompting means for prompting for a personal identification number;

receiving means for receiving the personal identification number; and using means for using the personal identification number to access the data structure in the storage device.

27. A client computer comprising:

detecting means for detecting, at the client computer, a storage device used to access the host computer;

first accessing means for accessing the storage device to obtain information from the storage device, wherein the information obtained from the storage device includes a directory entry name;

establishing means for establishing a connection to another computer based on the information obtained from the storage device;

retrieving means for retrieving a key ring from another computer using the information obtained from the storage device, wherein the retrieving means includes second accessing means for accessing the directory entry name to access a data structure in another computer to obtain the key ring; and third accessing means for accessing the host computer using the key ring.

28. A client computer comprising:

detecting means for detecting, at the client computer, a storage device used to access the host computer;

first accessing means for accessing the storage device to obtain information from the storage device, wherein the information obtained from the storage device includes a directory entry name;

establishing means for establishing a connection to another computer based on the information obtained from the storage device;

retrieving means for retrieving a key ring from another computer using the information obtained from the storage device and further comprising;

second accessing means for accessing the directory entry name to access a data structure in another computer to obtain the key ring;

second retrieving means for retrieving configuration information associated with the directory entry name; and third accessing means for accessing the host computer using the key ring.

29. A computer program product in a computer readable medium for accessing a host computer, the computer program product comprising:

first instructions for receiving a data structure at a client computer, for use in accessing a host computer;

second instructions for identifying a location of a computer containing a key ring for a user using the data structure, wherein the data structure contains an identification of the location of the computer;

third instructions for retrieving the key ring for the user from the computer in communication with the computer system; and fourth instructions for accessing the host computer using the key ring.

30. A method in a computer system for accessing a host computer comprising the computer system implemented steps of:

receiving a data structure at the computer system, for use in accessing a host computer;

identifying a location of a computer containing a key ring using the data structure, wherein the data structure contains an identification of the location of the computer containing the key ring;

retrieving the key ring for the user from the computer containing the key ring; and accessing the host computer using the key ring.

31. A data processing system in a computer system for accessing a host computer, the data processing system comprising:

a bus system;

a communications unit connected to the bus system;

a memory connected to the bus system, wherein the memory includes as set of instructions; and a processing unit connected to the bus system, wherein the processing unit executes the set of instructions to receive a data structure at the computer system, for use in accessing a host computer; identify a location of a computer containing a key ring using tee data structure in which the data structure contains an identification of the location of the computer, retrieve the key ring for the user from a server in communication with the computer system; and access the host computer using the key ring.

32. A data processing system in a client computer for accessing a host computer from a client computer, the data processing system comprising:

a bus system;

a communications unit connected to the bus system;

a memory connected to the bus system, wherein the memory includes as set of instructions; and a processing unit connected to the bus system, wherein the processing unit executes the set of instructions to detect, at the client computer, a storage device used to access the host computer; access the storage device to obtain information from the storage device; establish a connection to another computer based on the information obtained from the storage device; retrieve a key ring from another computer using the information obtained from the storage device; and access the host computer using the key ring.

33. A data processing system for accessing a host computer from the data processing system, the data processing system comprising:

a bus system;

a communications unit connected to the bus system;

a memory connected to the bus system, wherein the memory includes as set of instructions; and a processing unit connected to the bus system, wherein the processing unit executes the set of instructions to detect, at the client computer, a storage device used to access the host computer; access the storage device to obtain information from the storage device in which the information obtained from the storage device includes a directory entry name; establish a connection to another computer based on the information obtained from the storage device; and retrieve a key ring from the another computer using the information obtained from the storage device to access a data structure in another computer to obtain the key ring and access the host computer using the key ring.

34. A data processing system for accessing a host computer from the data processing system, the data processing system comprising:

a bus system;

a communications unit connected to the bus system;

a memory connected to the bus system, wherein the memory includes as set of instructions; and a processing unit connected to the bus system, wherein the processing unit executes the set of instructions to detect, at the client computer, a storage device used to access the host computer; access the storage device to obtain information from the storage device in which the information obtained from the storage device includes a directory entry name; establish a connection to another computer based on the information obtained from the storage device; retrieve a key ring from the another computer using the information obtained from the storage device to access a data structure in the another computer to obtain the key Ting; and retrieve configuration information associated with the directory entry name; and access the host computer using the key ring.

35. A computer program product in a computer readable medium for accessing a host computer from a client computer, the computer program product comprising:

first instructions for detecting, at the client computer, a storage device used to ads the host computer;

second instructions for accessing the storage device to obtain information from the storage device, wherein the information obtained from the storage device includes a directory entry name;

third instructions for establishing a connection to another computer based on the information obtained from the storage device;

fourth instructions for retrieving a key ring from another computer using the information obtained from the storage device to access a data structure in another computer to obtain the key ring; and fifth instructions for accessing the host computer using the key ring.

36. A computer program product in a computer readable medium for accessing a host computer from a client computer, the computer program product comprising:

first instructions for detecting, at the client computer, a storage device used to access the host computer;

second instructions for accessing the storage device to obtain information from the storage device, wherein the information obtained from the storage device includes a directory entry name;

third instructions for establishing a connection to another computer based on the information obtained from the storage device;

fourth instructions for retrieving a key ring from another computer using the information obtained from the storage device to access a data structure in another computer to obtain the key ring;

fifth instructions for retrieving configuration information associated with the directory entry name; and sixth instructions for accessing the host computer using the key ring.

* * * * *